United States Patent
Jaldén et al.

(10) Patent No.: US 10,389,424 B2
(45) Date of Patent: Aug. 20, 2019

(54) METHOD FOR ADAPTING A BEAM SHAPE OF A BEAM

(71) Applicant: Telefonaktiebolaget LM Ericsson (publ), Stockholm (SE)

(72) Inventors: Niklas Jaldén, Enköping (SE); Henrik Asplund, Stockholm (SE); David Astely, Bromma (SE); Martin Johansson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/066,037

(22) PCT Filed: Feb. 4, 2016

(86) PCT No.: PCT/EP2016/052372
§ 371 (c)(1),
(2) Date: Jun. 25, 2018

(87) PCT Pub. No.: WO2017/133772
PCT Pub. Date: Aug. 10, 2017

(65) Prior Publication Data
US 2019/0013850 A1 Jan. 10, 2019

(51) Int. Cl.
*H04B 7/06* (2006.01)
*H04B 7/024* (2017.01)
(Continued)

(52) U.S. Cl.
CPC ........... *H04B 7/0617* (2013.01); *H04B 7/024* (2013.01); *H04B 7/0634* (2013.01);
(Continued)

(58) Field of Classification Search
CPC ...... H04B 7/0639; H04B 7/0695; H04B 7/10; H04B 7/0805; H04B 7/0478; H04B 3/32;
(Continued)

(56) References Cited

U.S. PATENT DOCUMENTS

| | | | | |
|---|---|---|---|---|
| 7,602,838 B2 * | 10/2009 | Bottomley | ........ | H03M 13/2957 375/144 |
| 8,000,418 B2 * | 8/2011 | Jin | ........... | H01Q 3/2617 342/368 |

(Continued)

FOREIGN PATENT DOCUMENTS

| EP | 2632058 A1 | 8/2013 |
|---|---|---|
| WO | 2016055092 A1 | 4/2016 |
| WO | 2016096001 A1 | 6/2016 |

OTHER PUBLICATIONS

Ericsson, "R3-130920: SON for AAS: Scenario Prioritization," Third Generation Partnership Project (3GPP), TSG-RAN WG3#80, May 20-24, 2013, 6 pages, Fukuoka, Japan.

(Continued)

*Primary Examiner* — James M Perez
(74) *Attorney, Agent, or Firm* — Withrow & Terranova, PLLC

(57) ABSTRACT

A method for adapting a beam shape of a beam in a wireless communication system having multiple nodes is disclosed. Each node is provided with an antenna system configured to provide radio coverage in a cell by a cell specific beam. The method comprises: calculating a transmit weight vector for each user to be served by a given cell based on information of spatial channel characteristics for the user to be served by the given cell and long term interference characteristics estimated based on aggregated information of spatial channel characteristics for users that the given cell should avoid interfering with and that are served by other cells; performing phase normalization of the calculated transmit weight vectors; and aggregating all transmit weight vectors to establish a common transmit weight vector used to form the beam shape for the cell specific beam.

22 Claims, 6 Drawing Sheets

(51) Int. Cl.
*H04W 16/28* (2009.01)
*H04W 24/02* (2009.01)

(52) U.S. Cl.
CPC ............ *H04W 16/28* (2013.01); *H04B 7/0626* (2013.01); *H04W 24/02* (2013.01)

(58) Field of Classification Search
CPC ........ H04B 3/23; H04W 52/42; H04W 16/28; H04M 1/00; H04L 25/03343; H04L 25/497; H04L 25/03057
USPC ................................. 375/259–285, 316–352
See application file for complete search history.

(56) References Cited

U.S. PATENT DOCUMENTS

| | | | | |
|---|---|---|---|---|
| 8,515,440 | B2* | 8/2013 | Damnjanovic | H04B 7/022 455/450 |
| 8,861,637 | B2* | 10/2014 | Na | H04L 25/03343 375/232 |
| 8,862,143 | B2* | 10/2014 | Damnjanovic | H04B 7/022 455/450 |
| 9,124,313 | B2* | 9/2015 | Ko | H04B 7/024 |
| 9,136,995 | B2* | 9/2015 | Thomas | H04L 5/0032 |
| 9,369,309 | B2* | 6/2016 | Seyama | H04L 25/0202 |
| 9,420,476 | B2* | 8/2016 | Koutsimanis | H04J 11/005 |
| 9,484,995 | B2* | 11/2016 | Gao | H04B 7/0456 |
| 9,531,459 | B2* | 12/2016 | Harrison | H04B 7/0456 |
| 9,596,061 | B2* | 3/2017 | Wallen | H04L 5/0023 |
| 9,621,233 | B2* | 4/2017 | Lee | H04B 7/0452 |
| 9,634,785 | B2* | 4/2017 | Lee | H04B 7/0486 |
| 9,674,004 | B2* | 6/2017 | Tanaka | H04L 5/0035 |
| 10,033,447 | B2* | 7/2018 | Onggosanusi | H04B 7/024 |
| 10,063,304 | B2* | 8/2018 | Frenne | H04B 7/0626 |
| 10,103,832 | B2* | 10/2018 | Koutsimanis | H04J 11/005 |
| 10,116,370 | B2* | 10/2018 | Obara | H04B 7/04 |
| 10,164,747 | B2* | 12/2018 | Onggosanusi | H04B 7/0469 |
| 10,211,906 | B1* | 2/2019 | Nam | H04B 7/0478 |
| 2004/0198452 | A1* | 10/2004 | Roy | H04B 7/0854 455/562.1 |
| 2006/0111149 | A1* | 5/2006 | Chitrapu | H01Q 1/246 455/562.1 |
| 2006/0194617 | A1* | 8/2006 | Scherzer | H04W 16/00 455/562.1 |
| 2008/0207270 | A1* | 8/2008 | Na | H04B 7/0617 455/562.1 |
| 2009/0274074 | A1* | 11/2009 | Astely | H04B 7/0619 370/280 |
| 2011/0053646 | A1* | 3/2011 | Kundmann | H01Q 3/267 455/562.1 |
| 2011/0122819 | A1* | 5/2011 | Jongren | H04L 1/1635 370/328 |
| 2011/0188393 | A1* | 8/2011 | Mallik | H04B 7/024 370/252 |
| 2011/0244847 | A1* | 10/2011 | Mallik | H04B 7/024 455/422.1 |
| 2012/0040701 | A1* | 2/2012 | Tong | H04W 52/243 455/501 |
| 2012/0189077 | A1* | 7/2012 | Seo | H04B 7/024 375/267 |
| 2012/0276937 | A1* | 11/2012 | Astely | H04W 72/082 455/501 |
| 2012/0328036 | A1* | 12/2012 | Chang | H01Q 1/2258 375/267 |
| 2013/0090126 | A1* | 4/2013 | Xing | H04B 7/0617 455/452.1 |
| 2013/0194950 | A1* | 8/2013 | Haghighat | H04W 24/02 370/252 |
| 2013/0294352 | A1* | 11/2013 | Park | H04B 7/024 370/328 |
| 2013/0336233 | A1* | 12/2013 | Kim | H04B 7/0452 370/329 |
| 2014/0219190 | A1* | 8/2014 | Molnar | H04B 7/0632 370/329 |
| 2014/0233457 | A1* | 8/2014 | Koutsimanis | H04J 11/005 370/328 |
| 2014/0315559 | A1* | 10/2014 | To | H04W 24/02 455/446 |
| 2014/0328423 | A1* | 11/2014 | Agee | H04B 7/0413 375/267 |
| 2015/0092583 | A1* | 4/2015 | Balraj | H04L 1/0003 370/252 |
| 2015/0326290 | A1* | 11/2015 | Harrison | H04B 7/0456 375/260 |
| 2015/0349864 | A1* | 12/2015 | Kim | H04J 11/00 375/299 |
| 2015/0358059 | A1* | 12/2015 | Kim | H04B 7/0456 370/329 |
| 2016/0128081 | A1* | 5/2016 | Auer | H04J 11/005 455/450 |
| 2016/0142117 | A1* | 5/2016 | Rahman | H04B 7/0469 375/267 |
| 2016/0156401 | A1* | 6/2016 | Onggosanusi | H04B 7/0478 370/329 |
| 2016/0227462 | A1* | 8/2016 | Axmon | H04W 36/32 |
| 2016/0337874 | A1* | 11/2016 | Yang | H04B 7/0469 |
| 2016/0353290 | A1* | 12/2016 | Nammi | H04W 16/26 |
| 2016/0359538 | A1* | 12/2016 | Onggosanusi | H04B 7/0469 |
| 2017/0047977 | A1* | 2/2017 | Kim | H04B 7/10 |
| 2017/0134082 | A1* | 5/2017 | Onggosanusi | H04B 7/0478 |
| 2017/0222703 | A1* | 8/2017 | Thomas | H04B 7/0617 |
| 2017/0244533 | A1* | 8/2017 | Onggosanusi | H04B 7/0478 |
| 2017/0279501 | A1* | 9/2017 | Kim | H04B 7/0413 |
| 2017/0311180 | A1* | 10/2017 | Jalden | H04B 7/0617 |
| 2017/0331541 | A1* | 11/2017 | Kang | H04B 7/0469 |
| 2017/0331577 | A1* | 11/2017 | Parkvall | H04J 11/0079 |
| 2017/0331670 | A1* | 11/2017 | Parkvall | H04W 52/0274 |
| 2018/0034523 | A1* | 2/2018 | Kim | H04B 7/0617 |
| 2018/0062724 | A1* | 3/2018 | Onggosanusi | H04B 7/0478 |
| 2018/0063826 | A1* | 3/2018 | Kim | H04B 7/0413 |
| 2018/0076870 | A1* | 3/2018 | Kim | H04B 7/04 |
| 2018/0083660 | A1* | 3/2018 | van Houtum | H04B 17/20 |
| 2018/0175993 | A1* | 6/2018 | Onggosanusi | H04L 5/0057 |
| 2018/0316402 | A1* | 11/2018 | Jalden | H04B 7/0617 |
| 2018/0375548 | A1* | 12/2018 | Li | H04B 7/024 |
| 2018/0375554 | A1* | 12/2018 | Faxer | H04W 52/36 |
| 2019/0011852 | A1* | 1/2019 | Frenne | H04B 7/0626 |
| 2019/0013850 | A1* | 1/2019 | Jalden | H04B 7/024 |

OTHER PUBLICATIONS

Examination Report for European Patent Application No. 14780887.7, dated May 22, 2018, 6 pages.
Non-Final Office Action for U.S. Appl. No. 15/516,082, dated Mar. 19, 2018, 9 pages.
International Search Report and Written Opinion for International Patent Application No. PCT/EP2014/071366, dated Jun. 3, 2015, 9 pages.
International Search Report and Written Opinion for International Patent Application No. PCT/EP2014/078326, dated Aug. 3, 2015, 9 pages.
International Search Report and Written Opinion for International Patent Application No. PCT/EP2016/052372, dated Sep. 23, 2016, 10 pages.
Final Office Action for U.S. Appl. No. 15/516,082, dated Oct. 18, 2018, 11 pages.
Advisory Action for U.S. Appl. No. 15/516,082, dated Jan. 25, 2019, 3 pages.

* cited by examiner

METHOD FOR ADAPTING A BEAM SHAPE OF A BEAM

This application is a 35 U.S.C. § 371 national phase filing of International Application No. PCT/EP2016/052372, filed Feb. 4, 2016, the disclosure of which is incorporated herein by reference in its entirety.

TECHNICAL FIELD

The present invention relates to a method for adapting a beam shape of a beam in a wireless communication system according to claim 1. The present invention also relates to a node, a communication system and a computer program configured to adapt the beam shape of a beam.

BACKGROUND

An efficient method to achieve high data-rate coverage in wireless communication is to use multiple antennas both at the transmitter and the receiver, since it makes it is possible to exploit the spatial degrees of freedom offered by multipath fading inside the wireless channel in order to provide a substantial increase in data rates and reliability of wireless transmission.

In the downlink, there are three basic approaches for utilizing the antenna: diversity, multiplexing and beamforming. With beamforming, the radiation pattern of the antennas may be controlled by transmitting a signal from a plurality of elements with an element specific gain and phase. In this way, radiation patterns with different pointing directions and beam widths in both elevation and azimuth directions may be created.

The gains from adjusting the beam shapes used for transmissions come from both increased received power (increased SNR) as well as a possibly lower interference (increased SINR) in a multi cell scenario. However, how much of these gains may be realized depends on how well the transmitting antenna system can direct the energy to the target users, and how well it avoids emitting energy to the interfered users.

The area of beamforming is usually divided in two parts, namely user specific beamforming (UE-BF) and cell specific beamforming (CS-BF). With user specific beamforming, the transmit beam used is chosen to optimize the channel between an eNB and a single user which is the method to use when transmitting user specific data. With CS-BF, beam are chosen to support all users within the cell, which is a method suitable for transmitting control information or other broadcast signals. Hence a cell-specific beam will generally cover a larger solid angle wider than a user specific beam.

In present wireless communication systems and frequency division duplexing FDD systems in particular, the user specific beamforming is typically implemented through the use of codebooks. There are both proprietary codebooks as well as standardized. When using codebook based transmissions, each user (which knows the codebook prior to transmission) may estimate what the gain would be for each code word and then feedback information of this to the eNB.

Cell specific beamforming, on the other hand, is standard transparent. Further, since the beams are supposed to suit all users within a cell, the best beam shape cannot be measured and optimized with a limited feedback from a few selected users. Therefore, one commonly assumed method to optimize cell specific beams is through the use of self-organizing network (SON) algorithms, sometimes called reconfigurable antenna system self-organizing networks (RAS-SON) algorithms. Such algorithms may typically measure some second order effect of changes in beam shapes, and optimize the beam shapes based on these. For example, one node may form some candidate cell specific beams, and then try these settings/beams in the network during a limited period of time, and evaluate which of these settings/beams that gives the best capacity or system throughput. This procedure is then repeated for various nodes/areas throughout the network to tune the overall setting and thus increase the overall network performance These types of RAS-SON algorithms are blind/semi-blind and hence they become relatively slow (depending on the amount of time for which each setting is evaluated). This will particularly be the case when the beam shapes of multiple cells are to be improved, as is typically the case in cellular networks.

Cell specific beamforming, and specifically optimization of the cell specific beam shapes, is typically done to define and isolate the cells from each other. Well isolated cells facilities the UE to make a better choice of serving cell for communication.

Thus, current cell shaping methods are typically blind/semi blind in the sense that the antenna patterns at one or more sites are changed slightly, and then they are evaluated for some period of time. To avoid instability in systems this period has to be long enough to be statistically representative of the traffic situation. This results in slow algorithms.

Further, since arbitrary combinations of weights in an array to generate arbitrary beam shapes is far too large (for large arrays) to test all, only a smaller restricted subset is usually considered. Such beam shapes, for example fixed beam width and some certain tilt settings, may not be optimal for neither received signal nor interference suppression.

SUMMARY

An object with the present invention is to provide an improved method for adapting a beam shape of a cell specific beam that serves users in a cell and reduces interference to or from users served by other cells compared to prior art solutions.

The object is achieved by a method for adapting a beam shape of a beam in a wireless communication system having multiple nodes. Each node is provided with an antenna system configured to provide radio coverage in a cell by a cell specific beam. The method comprises: obtaining information of users to be served by the cell, and obtaining information of users that the cell should avoid interfering with and that are served by other cells; obtaining information of a spatial channel characteristics for each of the users to be served by the cell; obtaining aggregated information of spatial channel characteristics for users that the cell should avoid interfering with, to estimate a long term interference characteristics; calculating a transmit weight vector for each of the users to be served by the cell based on the information of spatial channel characteristics for the user to be served by the cell and the estimated long term interference characteristics; performing phase normalization of the calculated transmit weight vector for each of the users to be served by the cell; and aggregating all transmit weight vectors of the users to serve to establish a common transmit weight vector used to form the beam shape for the cell specific beam.

The object is also achieved by a node configured to adapt a beam shape of a beam in a wireless communication system according to any of claims 14-21, a communication system according to claim 22, a computer program according to claim 23, and a computer-readable storage medium according to claim 24.

An advantage with the method is that an improved beam pattern of a beam covering a cell is directly calculated, and hence do not suffer from some of the inherent problems with prior art methods, such as speed.

Another advantage with the method is that it allows for full flexibility of the beam shapes it generates.

Further objects and advantages may be obtained from the detailed description by a skilled person in the art.

DETAILED DESCRIPTION

A tractable method is disclosed for generating beam patterns to be used for transmission of cell specific (reference) signals. The beam shapes are generated with a criterion to optimize the received signal power at the served users while minimizing the interference generated to non-served users. The method is tractable in the sense that given spatial channel information to the served and interfered users, an appropriate beam shape is determined directly removing the need for using trial and error based method such as current state of the art RAS-SON algorithms.

Also, future generations of wireless system are expected to provide ubiquitous high data-rate coverage. Achieving this requires an efficient use of the available resources. In light of this higher number of antenna elements, at both the transmitter and receiver, are considered in future standards of LTE for example. With multiple antennas at the transmitter and/or the receiver, it is possible to exploit the spatial degrees of freedom offered by the multipath fading inside the wireless channel in order to provide a substantial increase in the data rates and reliability of wireless transmission.

When considering an optimal beam pattern to use for transmission (to a single user), different metrics may be considered. In general, if the interference created to the rest of the system is not considered, a good metric is typically to maximize the received power at the UE. This may be obtained provided that information of the spatial channel characteristics between eNB and UE, for example the covariance information at the transmitter/eNB, is known by using a transmit weight vector corresponding to the eigenvector that corresponds to the strongest/largest eigenvalue of the covariance matrix, R. However, this method, as mentioned above, only maximizes the received power $s=w^H Rw$ at the UE.

Figure 1A:
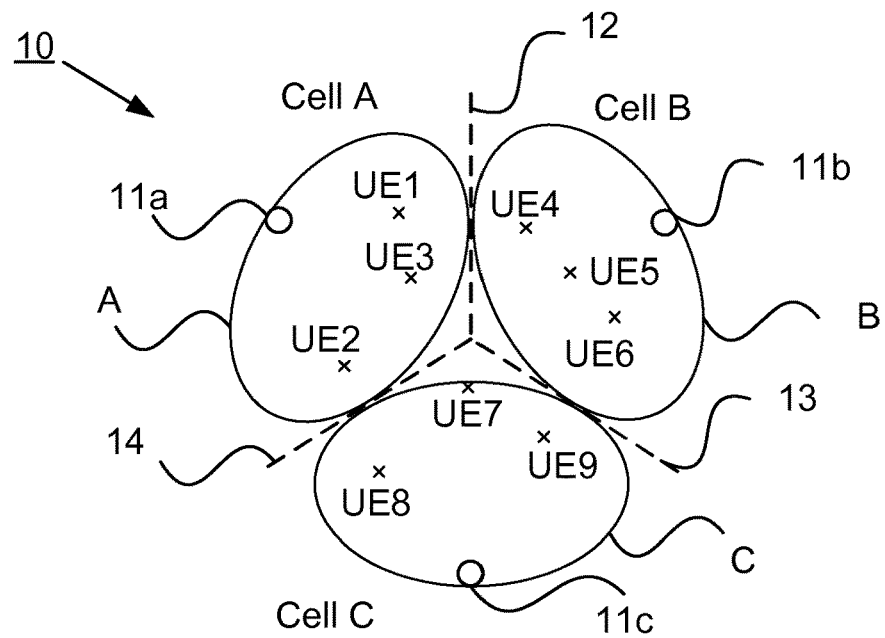
FIGS. 1a and 1b illustrate a wireless communication system with three cells.

FIG. 1a shows a wireless communication system 10 having three nodes 11a, 11b and 11c, wherein each node is provided with an antenna system (not shown) configured to provide radio coverage in a cell (cell A, cell B and cell C, respectively) by a cell specific beam (A, B and C, respectively). The boundary between the cells is illustrated by dashed lines 12, 13 and 14. In this example, cell A is serving users UE1-UE3, cell B is serving users UE4-UE6 and cell C is serving users UE7-UE9. Limited overlap in cell coverage between the different cells is anticipated and users in other cells do not have to be taken into consideration when performing beam shaping of the cell specific beam.

Figure 1B:
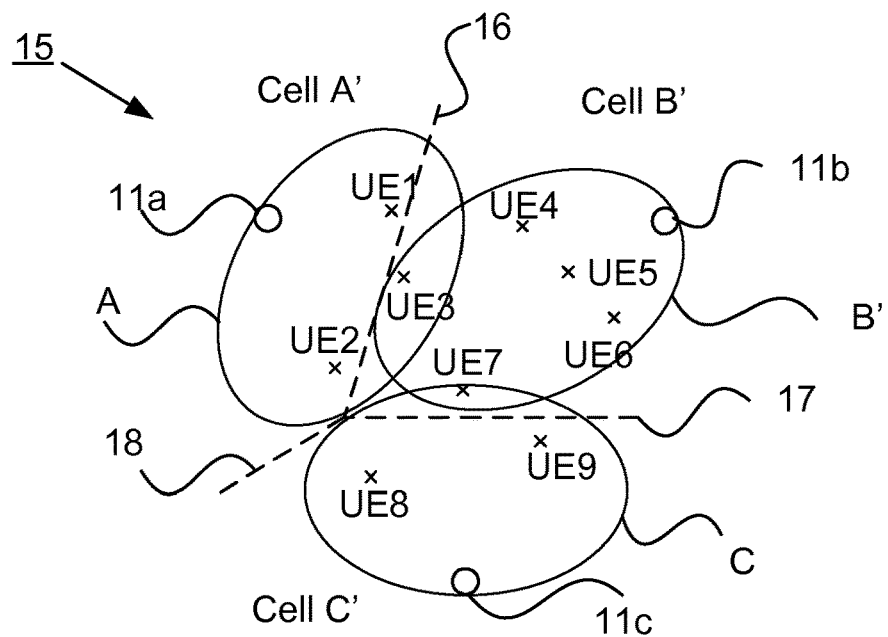

However, if the radio coverage in a cell, e.g. cell B, is changed due to load balancing reason a different beam forming solution may be needed. FIG. 1b illustrate a wireless communication system 15, which comprises the same node structure 11a, 11b and 11c and each node is provided with an antenna system (not shown) configured to provide radio coverage in a cell (cell A', cell B' and cell C', respectively) by a cell specific beam (A', B' and C', respectively). The boundary between the cells is illustrated by dashed lines 16, 17 and 18. In this example, cell A' is serving users UE1 and UE2, cell B' is serving users UE3-UE7 and cell C' is serving users UE 8 and UE9. The change in cell coverage for cell B' will affect transmission rate for UE3 and UE7, since the cell specific beam A will interfere user UE3 and the cell specific beam C will interfere user UE7.

So, if desired to maximize the received power $s=w^H Rw$ at the UE while minimizing the interference $q=w^H Qw$ to users served by other cells (assuming that information of spatial channel characteristics for the interfered users is represented by the interference covariance matrix Q) it is possible to precode/beamform a signal using a weight vector v corresponding to the eigenvector w (for corresponding eigenvalue $\lambda$) that maximizes the generalized eigenvalue problem $$Rw = \lambda Qw \qquad [1]$$

Figure 2A:
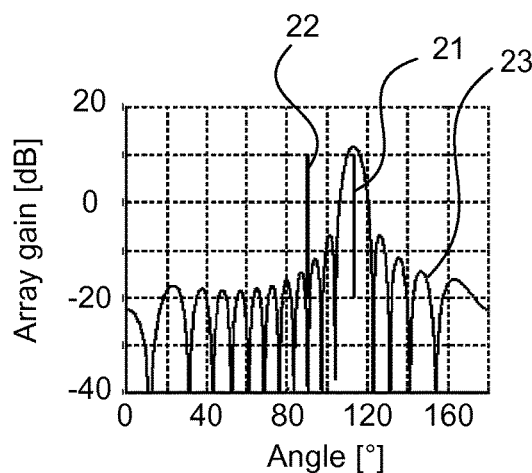
FIGS. 2a and 2b illustrate modification of a beam shape for a user according to the method.
Figure 2B:
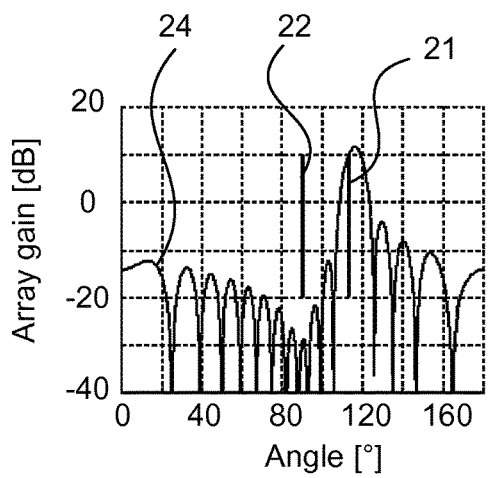

Note that the eigenvector $w_i$ corresponding to the largest eigenvalue $\lambda_i$ will be a beam that maximizes the ratio s/q. An example of the antenna pattern for a corresponding weight vector (in a 16 element antenna array) is shown in FIGS. 2a and 2b. The straight line 21 indicates the angle to a user that is served, whereas the line 22 indicates the angle to a user that the cell should avoid interfering with, also known as an interfered user.

When calculating the beam pattern to optimize the received power at the user pattern 23 illustrated in FIG. 2a is obtained. When optimizing the beam pattern to the user, while minimizing the interference, the beam pattern 24 illustrated in FIG. 2b is obtained. (Note that assumptions on angular spread and ratio of SINR to the intended user and interfered user are omitted, to highlight the effect of the method).

Note also that the eigenvector corresponding to one eigenvalue is a vector that points in a direction which is invariant under the associated linear transformation. Thus using the eigenvector (normalized eigenvector) will result in focusing the transmitted energy in one direction in space.

When considering cell specific beam forming, a beam that provides radio coverage to all served users equally good is desired. In a scenario where the users are widely spread or for example clustered in two directions using a beam shape corresponding to the generalized eigenvalue is not a good solution.

Figure 3:
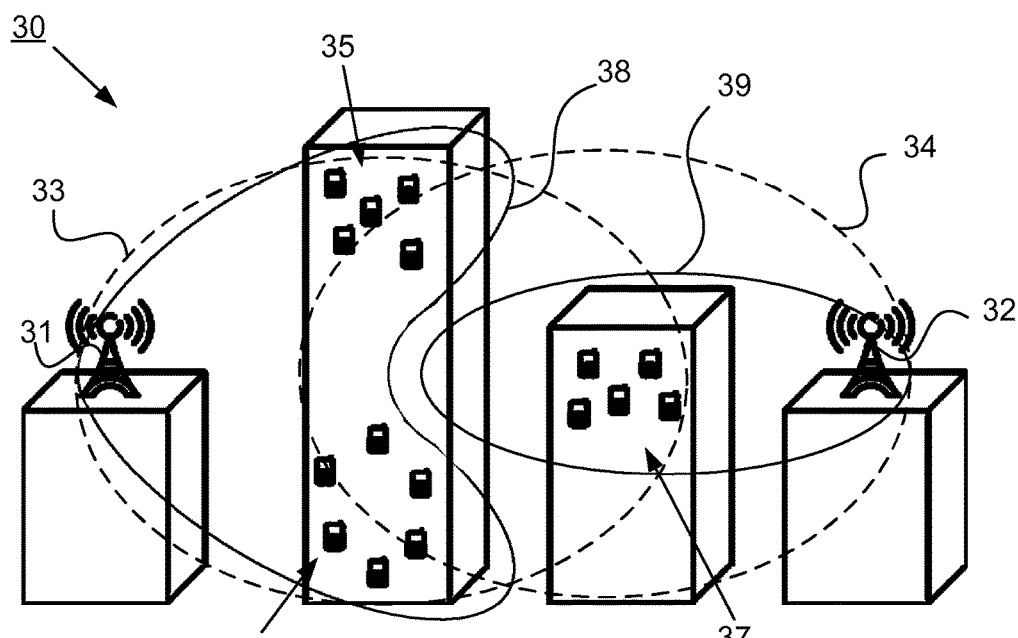
FIG. 3 illustrates adaptation of a beam shape in a wireless communication system.

FIG. 3 illustrates a wireless communication system 30 having two nodes 31 and 32. Each node is provided with an antenna system (not shown) configured to provide coverage in a cell by a cell specific beam. In the case where only users to be served by each cell is taken into consideration and no consideration is taken for interfered users (i.e. users to avoid interfering and that are served by other cells), then a cell specific beam as indicated by dashed line 33 for node 31, and a cell specific beam as indicated by dashed line 34 for node 32 are obtained. This will result in interference between the cell specific beams 33 and 34 since the users that node 31 is intended to transmit to are separated into two locations 35 and 36 (i.e. two UE clusters), and where the interfered users are located at third location 37 (separating the two UE clusters to be served).

It is desired that the cell specific beam 33 for node 31 is adapted to avoid interfering with users at the third location 37, which will change the shape of the cell specific beam as indicated by 38. The same applies for node 32 since it is desired that the cell specific beam 34 for node 32 is adapted to avoid interfering with users at the first and second locations 35 and 36, which will change the shape of the cell specific beam as indicated by 39. The process for changing the shape of the cell specific beam is illustrated in connection with the following figures.

Figure 4:
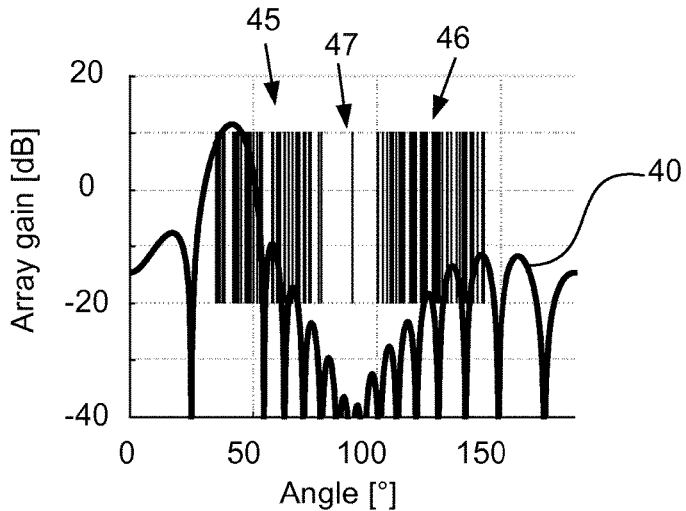
FIG. 4 illustrates a beam shape design when users are spatially separated according to prior art.

FIG. 4 illustrates an angular distribution of the users to be served for a node (similar to node 31 in FIG. 3). Users to be served are divided into a first location 45 (first UE cluster) and a second location 46 (second UE cluster) which are angularly separated (as for the users 35 and 36 in FIG. 3). A single interfered user is present for illustration purposes and the angular direction of interfered user at a third location 47 (third UE cluster) is placed between the first UE cluster and the second UE cluster. Assuming that the spatial covariance matrix to the users to be served is represented by R while the covariance to the interfered user is represented by Q. Then a beam shape 40 by using a weight vector that is the eigenvector corresponding to the largest eigenvalue solving the generalized eigenvalue problem (equation [1]) singles out only one part of the first UE cluster as illustrated in FIG. 4.

Figure 5:
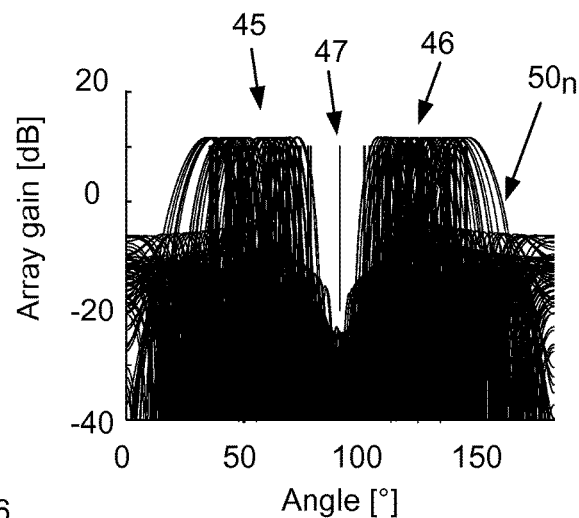
FIG. 5 illustrates an example with beam shapes for all served users in a cell according to the method.

FIG. 5 illustrates the angular distribution of the users to be served for the node in FIG. 4 together with beam shapes $50_n$, n=1 to k, for "k" served users in the cell. The individual beam shape $50_n$ corresponds to a calculated transmit weight vector for each of the users to be served by the cell based on the information of spatial channel characteristics for the user to be served by the cell while minimizing the interference (in the angular direction of the third UE cluster 47). The weight vectors are calculated to optimize the received power to each user, i.e. maximizing the received power for each user while minimizing the interference in the angular direction of the third UE cluster 47.

Figure 6:
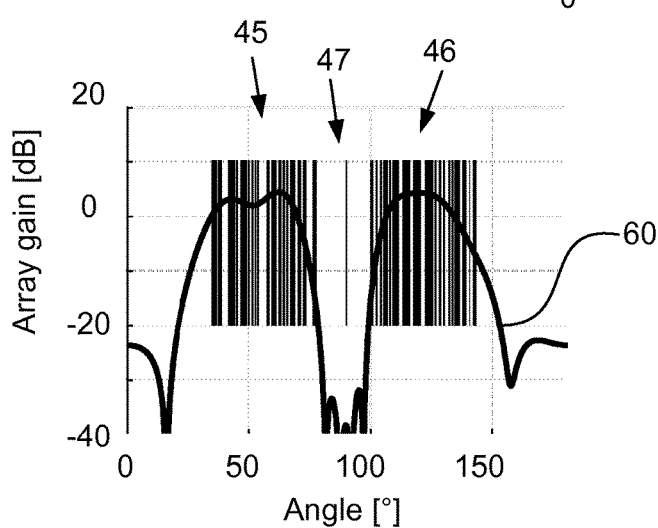
FIG. 6 illustrates a beam shape of the aggregated weight vector from FIG. 5.

FIG. 6 illustrates the beam shape 60 of the cell common aggregated transmit weight vectors, each transmit weight vector generating the individual beam shapes $50_n$ in FIG. 5. The beam shape 60 should be compared to the beam shape 40 in FIG. 4. The method to produce the aggregated transmit weight will be described in more detail in connection with FIG. 7.

Figure 7:
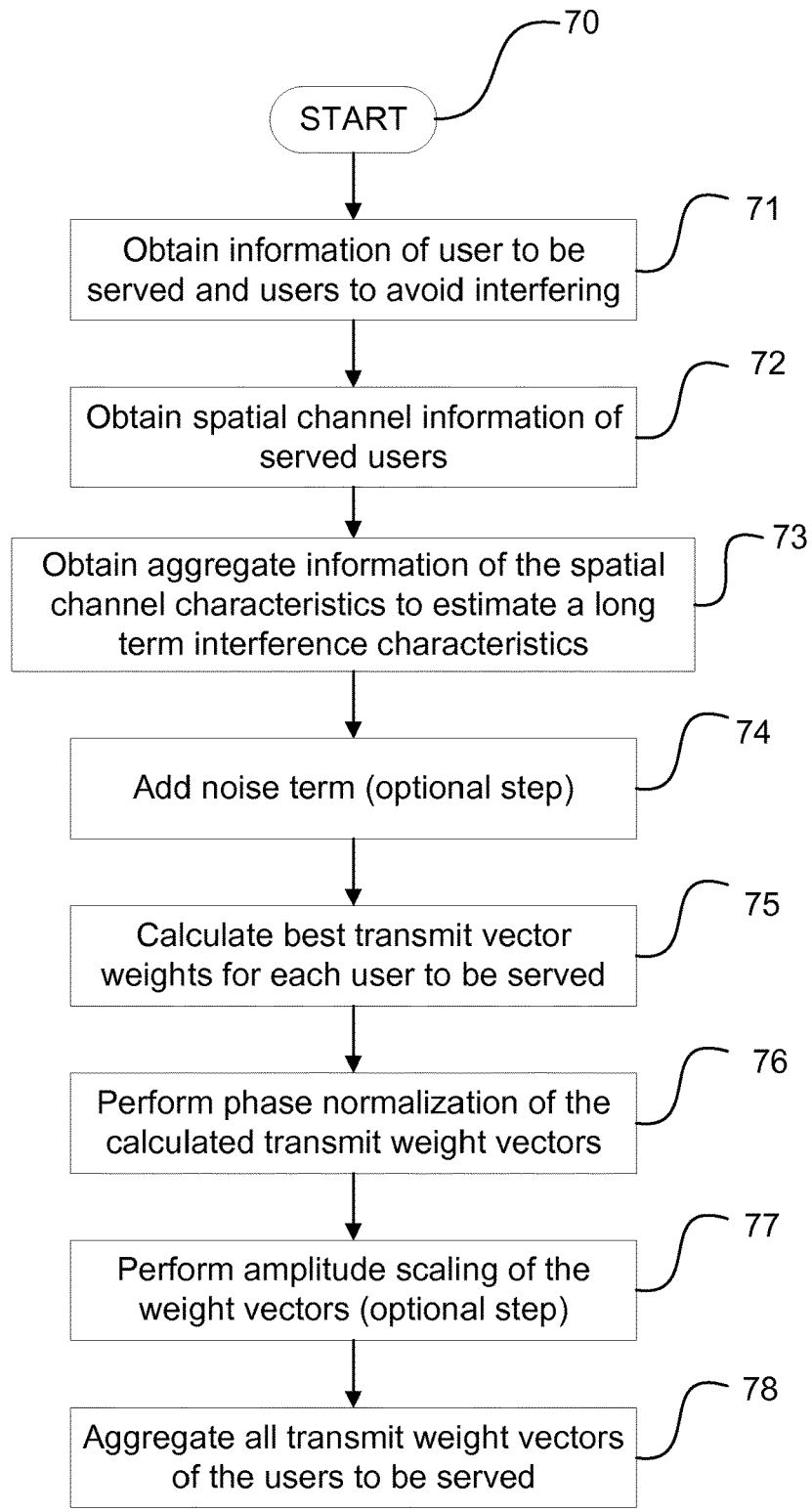
FIG. 7 illustrates a flowchart exemplifying the method.

FIG. 7 illustrates a flowchart exemplifying the method for adapting a beam shape of a beam in a wireless communication system. It should be noted that the method may be performed in a single node or be a distributed implementation, i.e. different steps of the method may be performed in different nodes.

The communication system have multiple nodes, wherein each node is provided with an antenna system configured to provide radio coverage in a cell by a cell specific beam. The method comprises a number of steps illustrated in FIG. 7.

The flow starts in step 70, and in step 71 information of users to be served by a given cell is obtained, e.g. obtaining information that UE1 and UE2 are served by cell A', and also information of users that the given cell should avoid interfering with and that are served by other cells is obtained, i.e. UE3-UE9 are served by other cells (as discussed in connection with FIG. 1b).

In step 72, information of a spatial channel characteristics for each of the users to be served by the given cell is obtained. The spatial channel characteristics describe a metric for the communication channels influence, such as location of the user in relation to the antenna system, transmission direction and/or angular spread. Normally the spatial channel characteristics comprise the covariance information which often is presented in a matrix.

Thus, the obtained information of spatial channel characteristics may comprise a location of each user in relation to the antenna system that provides radio coverage in the given cell, and/or a transmission direction of each user in relation to the antenna system that provides radio coverage in the given cell, and/or covariance information for each user. It is of course possible to use any other type of information (or representation of information) that describes the spatial channel characteristics.

The information of spatial channel characteristics may be obtained by measurement or by reading it from a database.

In step 73, aggregated information of spatial channel characteristics for users that the given cell should avoid interfering with is obtained, to estimate a long term interference characteristics. The estimated long term interference characteristics is used to identify angular directions in which to avoid transmitting in.

The obtained aggregated information of spatial channel characteristics may comprise obtaining spatial channel characteristics for each of the users that the given cell should avoid interfering with, and aggregating the information of spatial channel characteristics for the users that the given cell should avoid interfering with.

Alternatively, the aggregated information of spatial channel characteristics is obtained by measurement or by reading it from a database.

Step 74 is an optional step in which a noise term may be added to the long term interference characteristics with interference noise ratio (INR) based on based on some criterion. For instance:
   a. where the noise term is adjusted based on the current load in the cell or in the local region of the network
   b. where the current setting for the noise term is communicated to a SON-capable node
   c. where the noise term is adjusted based on a message from a SON-capable node.

A SON-capable node is a node that is capable of adjusting certain antenna (or node) settings according to a SON-function. A SON function, is a function that tunes certain node settings to improve some given network performance metric. For example, a SON function, may be a function that tunes node settings to enable load balancing between nodes. The effect of introducing a noise term is more described in connection with FIGS. 8a-8d.

In step 75, a transmit weight vector for each of the users to be served by the given cell is calculated based on the information of spatial channel characteristics for the user to be served by the given cell and the estimated long term interference characteristics.

An example of the process to calculate a transmit weight vector has been described in connection with FIG. 5. The transmit weight vector for each user to be served by the given cell is calculated finding the largest eigenvalue that solves a generalized eigenvalue problem:

$$R_n w_n = \lambda_n Q w_n \quad [2]$$

$R_n$ is covariance information for each user to be served by the given cell; $w_n$ is transmit weight vector; Q is aggregated covariance information for the users that the given cell should avoid interfering with; and $\lambda_n$ is eigenvalue.

In step 76, phase normalization of the calculated transmit weight vector for each of the users to be served by the given cell is performed. Each calculated transmit weight vector has a real component and an imaginary component and the phase normalization may comprise forcing a selected element (e.g. the largest or the smallest element) real, to avoid unintentional cancellation when aggregating the transmit weight vectors, which is performed in step 78.

The process of forcing the selected element (for instance the largest or the smallest element) real may be performed by multiplying each calculated transmit weight vector with a complex number, such that the complex phase of the selected element of the resulting weight vectors all have the same complex phase.

Step 77 is an optional step, wherein amplitude scaling of each weight vector is performed prior to aggregating all transmit weight vectors of the users to be served by the given cell.

The amplitude scaling may comprise: normalizing each weight vector; scaling the amplitude based on a given angular resolution; and/or prioritizing selected users and/or transmit directions.

In step 78, all transmit weight vectors of the users to serve are aggregated to establish a common transmit weight vector used to form the beam shape for the cell specific beam.

As mentioned above, the method to adapt a beam shape of a beam in a wireless communication system may be implemented in a single node. The communication system comprises multiple nodes, and each node is provided with an antenna system configured to provide radio coverage in a cell by a cell specific beam. The node provides coverage in a given cell and is configured to:
  obtain information of users to be served by the given cell, and obtain information of users that the given cell should avoid interfering with and that are served by other cells;
  obtain information of a spatial channel characteristics for each of the users to be served by the given cell;
  obtain aggregated information of spatial channel characteristics for users that the given cell should avoid interfering with, to estimate a long term interference characteristics;
  calculate a transmit weight vector for each of the users to be served by the given cell based on the information of spatial channel characteristics for the user to be served by the given cell and the estimated long term interference characteristics;
  perform phase normalization of the calculated transmit weight vector for each of the users to be served by the given cell; and
  aggregate all transmit weight vectors of the users to serve to establish a common transmit weight vector used to form the beam shape for the cell specific beam.

The phase normalization may be performed by multiplying each calculated transmit weight vector with a complex number, such that the complex phase of the selected element (real or imaginary element) of the resulting weight vectors all have the same complex phase.

The node may also be configured to obtain spatial channel characteristics for each of the users that the given cell should avoid interfering with, and aggregate the information of spatial channel characteristics for the users that the given cell should avoid interfering with, to obtain the aggregated information of spatial channel characteristics for users that the given cell should avoid interfering with. Alternatively, the node may be configured to obtain aggregated information of spatial channel characteristics by measurement or by reading it from a database.

The node may be configured to obtain information of spatial channel characteristics by measurement or by reading it from a database.

The node may further be configured to perform amplitude scaling of each weight vector prior to aggregating all transmit weight vectors of the users to be served by the given cell. The amplitude scaling may comprise:
  a) normalizing each weight vector, and/or
  b) scaling the amplitude based on a given angular resolution, and/or
  c) prioritizing selected users and/or transmit directions.

Furthermore, the node may be configured to add a noise term to the long term interference characteristics.

The node may further be configured to:
  a) adjust the noise term based on the current load in the cell or in the local region of the network, and/or
  b) communicate the current setting for the noise term to a SON-capable node, and/or
  c) adjust the noise term based on a message from a SON-capable node.

The method may also be implemented in a communication system having multiple nodes, wherein each node is provided with an antenna system configured to provide coverage in a cell by a cell specific beam. At least one of the nodes is configured to adapt a beam shape of a beam as described above.

The method described in connection with FIG. 7 may be implemented in a computer program for adapting a beam shape of a beam, comprising instructions which, when executed on at least one processor, cause the at least one processor to carry out the method. Each node may be provided with one or more processors. Furthermore, computer-readable storage medium may be configured to carry the computer program for adapting a beam shape of a beam according to the method.

FIGS. 8a-8d illustrate how an added noise level affects the calculation of transmit weight vectors.

Figure 8A:
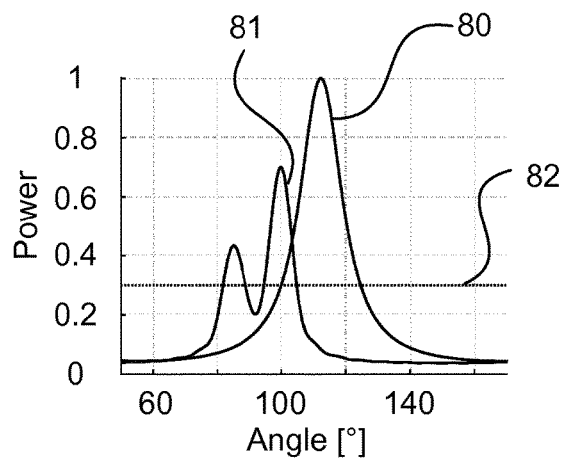
FIGS. 8a-8d illustrate how an added noise level affects the calculation of transmit weight vectors.

FIG. 8a illustrates a graph for two different power angular spectrums as a function of angle. A first power angular spectrum 80 for a user to be served by the cell, and a second power angular spectrum 81 for interfered users served by another cell is illustrated and the power angular spectrums are normalized to the maximum value of the first power angular spectrum 80. A noise level 82 is included in FIG. 8a to identify relevant angular directions where the cell should avoid transmitting the cell specific beam in. In this example, two angular directions are identified coinciding with the peaks of spectrum 81 at approximately 85° and 100°. This is also illustrated in FIG. 8b as lines 83 and 84, respectively.

Figure 8B:
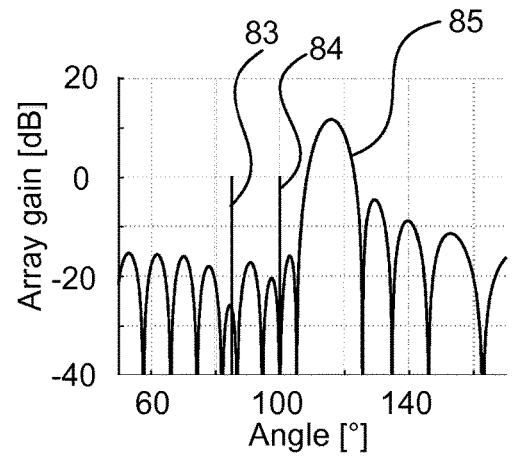

FIG. 8b illustrates a graph for array gain [dB] as a function of angle and include a beam shape 85 to provide coverage to the user to be served by the cell, and at the same time avoid transmitting the cell specific beam in the identified directions indicated by 83 and 84. As can be seen in FIG. 8b, the array gain for users at 85° is less than −25 dB and the array gain for users at 100° is less than −40 dB.

By shifting the noise level up or down, the array gain for users at 85° and 100° may be varied. This is illustrated in FIGS. 8c and 8d.

Figure 8C:
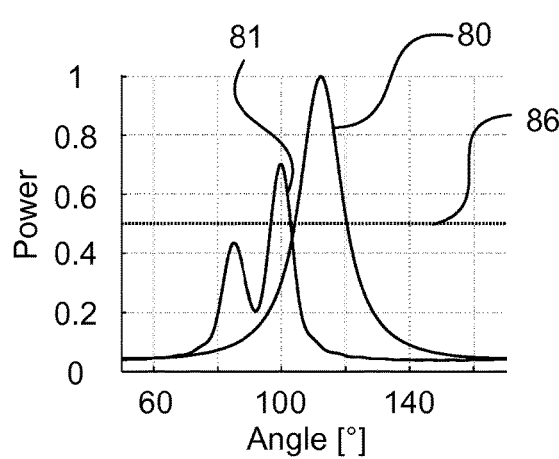

FIG. 8c is identical to FIG. 8a with one exception. The noise level 86 is raised from 0.3 to 0.5, and in FIG. 8d, the result from the increased noise level is illustrated. It should be noted that in the second power angular spectrum 81 there is only one peak at 100° that is above the noise level 86.

Figure 8D:
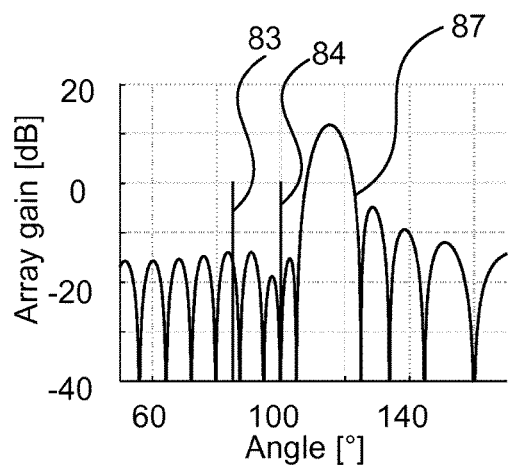

FIG. 8d illustrates a graph for array gain [dB] as a function of angle and include a beam shape 87 to provide coverage to the user to be served by the cell, and at the same time avoid transmitting the cell specific beam in the identified directions indicated by 83 and 84. As can be seen in FIG. 8d, the array gain for users at 85° is approximately 10 dB higher than in FIG. 8b, and the array gain for users at 100° remains very low.

Figure 9:
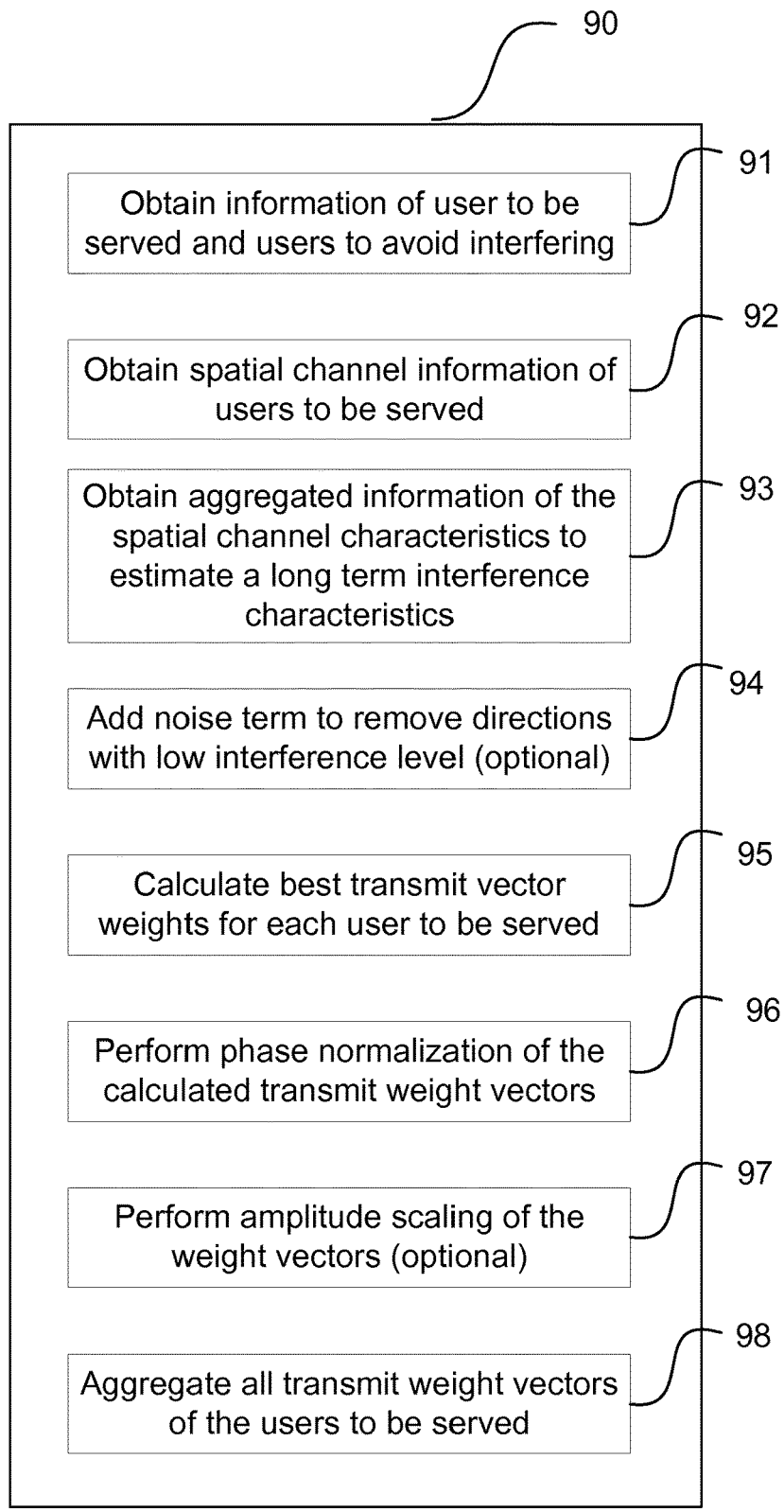
FIG. 9 illustrates a node configured to perform the method.

FIG. 9 illustrates an apparatus 90 configured to perform the method to adapt a beam shape of a beam in a wireless communication system having multiple nodes and each node is provided with an antenna system configured to provide radio coverage in a cell by a cell specific beam. The apparatus comprises:

a first module 91 configured to obtain information of users to be served by a given cell, and obtain information of users that the given cell should avoid interfering with and that are served by other cells, a second module 92 to obtain information of a spatial channel characteristics for each of the users to be served by the given cell, a third module 93 to obtain aggregated information of spatial channel characteristics for users that the given cell should avoid interfering with, to estimate a long term interference characteristics, an optional fourth module 94 to add a noise term to the long term interference characteristics, a fifth module 95 to calculate a transmit weight vector for each of the users to be served by the given cell based on the information of spatial channel characteristics for the user to be served by the given cell and the estimated long term interference characteristics, a sixth module 96 to perform phase normalization of the calculated transmit weight vector for each of the users to be served by the given cell, an optional seventh module 97 to perform amplitude scaling of each weight vector prior to aggregating all transmit weight vectors of the users to be served by the given cell, and an eight module 98 to aggregate all transmit weight vectors of the users to serve to establish a common transmit weight vector used to form the beam shape for the cell specific beam.

The term "user" does not have to be a physical user, and may also represent a location where a user may be. For instance, if a location within a given cell is prioritized to be served (or prioritized to avoid interfering with) then this location should always be considered when establishing the common transmit weight vector.

Abbreviations

CS-BF—Cell Specific BeamForming
eNB—E-UTRAN Node B (evolved Node B)
INR—Interference Noise Ratio
RAS-SON—Reconfigurable Antenna System Self-Organizing Network
SINR—Signal-to-Interference-plus-Noise Ratio
SON—Self-Organizing Network
SNR—Signal-to-Noise Ratio
UE-BF—User specific BeamForming

The invention claimed is:

1. A method for adapting a beam shape of a beam in a wireless communication system, said communication system having multiple nodes, wherein each node is provided with an antenna system configured to provide radio coverage in a cell by a cell specific beam, the method comprising:

obtaining information of users to be served by a given cell, and obtaining information of users that said given cell should avoid interfering with and that are served by other cells;

obtaining information of a spatial channel characteristics for each of said users to be served by said given cell;

obtaining aggregated information of spatial channel characteristics for users that said given cell should avoid interfering with, to estimate a long term interference characteristics;

calculating a transmit weight vector for each of said users to be served by said given cell based on the information of spatial channel characteristics for said user to be served by said given cell and the estimated long term interference characteristics;

performing phase normalization of the calculated transmit weight vector for each of said users to be served by said given cell;

aggregating all transmit weight vectors of the users to serve to establish a common transmit weight vector used to form the beam shape for the cell specific beam; and transmitting the cell specific beam in a beam shape formed by the common transmit weight vector.

2. The method according to claim 1, wherein the step of obtaining aggregated information of spatial channel characteristics comprises:

obtaining spatial channel characteristics for each of said users that said given cell should avoid interfering with, and aggregating the information of spatial channel characteristics for said users that said given cell should avoid interfering with.

3. The method according to claim 1, wherein the step of obtaining aggregated information of spatial channel characteristics is obtained by measurement or by reading it from a database.

4. The method according to claim 1, wherein the obtained information of spatial channel characteristics comprise a location of each user in relation to the antenna system providing radio coverage in said given cell.

5. The method according to claim 1, wherein the obtained information of spatial channel characteristics comprise a transmission direction of each user in relation to the antenna system providing radio coverage in said given cell.

6. The method according to claim 1, wherein the obtained information of spatial channel characteristics comprises covariance information for each user.

7. The method according to claim 6, wherein the transmit weight vector for each user to be served by said given cell is calculated finding the largest eigenvalue that solves a generalized eigenvalue problem:

$$R_n w_n = \lambda_n Q W_n$$

$R_n$ is covariance information for each user to be served by said given cell; $w_n$ is transmit weight vector; Q is aggregated covariance information for said users that the given cell should avoid interfering with; and $\lambda_n$ is eigenvalue.

8. The method according to claim 1, wherein each calculated transmit weight vector has a real component and an imaginary component and said phase normalization further comprises multiplying each calculated transmit weight vector with a complex number, such that the complex phase of a selected element of the resulting weight vectors all have the same complex phase.

9. The method according to claim 1, wherein the method further comprises:
obtaining information of spatial channel characteristics by measurement or by reading it from a database.

10. The method according to claim 1, wherein the method further comprises:
performing amplitude scaling of each weight vector prior to aggregating all transmit weight vectors of said users to be served by said given cell.

11. The method according to claim 10, wherein the amplitude scaling comprises:
normalizing each weight vector, and/or
scaling the amplitude based on a given angular resolution, and/or
prioritizing selected users and/or transmit directions.

12. The method according to claim 1, wherein the method further comprises adding a noise term to the long term interference characteristics.

13. The method according to claim 12, wherein:
the noise term is adjusted based on the current load in the cell or in the local region of the network, and/or
the current setting for the noise term is communicated to a SON-capable node, and/or
the noise term is adjusted based on a message from a SON-capable node.

14. A node configured to adapt a beam shape of a beam in a wireless communication system having multiple nodes, said node comprising:
an antenna system configured to provide radio coverage in a given cell by a cell specific beam, wherein said node is configured to:
obtain information of users to be served by said given cell, and obtain information of users that said given cell should avoid interfering with and that are served by other cells;
obtain information of a spatial channel characteristics for each of said users to be served by said given cell;
obtain aggregated information of spatial channel characteristics for users that said given cell should avoid interfering with, to estimate a long term interference characteristics;
calculate a transmit weight vector for each of said users to be served by said given cell based on the information of spatial channel characteristics for said user to be served by said given cell and the estimated long term interference characteristics;
perform phase normalization of the calculated transmit weight vector for each of said users to be served by said given cell;
aggregate all transmit weight vectors of the users to serve to establish a common transmit weight vector used to form the beam shape for the cell specific beam; and
transmit the cell specific beam in a beam shape formed by the common transmit weight vector.

15. The node according to claim 14, wherein said node is further configured to:
obtain spatial channel characteristics for each of said users that said given cell should avoid interfering with, and
aggregate the information of spatial channel characteristics for said users that the given cell should avoid interfering with,
to obtain said aggregated information of spatial channel characteristics for users that said given cell should avoid interfering with.

16. The node according to claim 14 wherein said node is further configured to:
obtain aggregated information of spatial channel characteristics by measurement or by reading it from a database.

17. The node according to claim 14, wherein said node further is configured to obtain information of spatial channel characteristics by measurement or by reading it from a database.

18. The node according to claim 14, wherein said node further is configured to perform amplitude scaling of each weight vector prior to aggregating all transmit weight vectors of said users to be served by said given cell.

19. The node according to claim 18, wherein the performed amplitude scaling comprises:
normalizing each weight vector, and/or
scaling the amplitude based on a given angular resolution, and/or
prioritizing selected users and/or transmit directions.

20. The node according to claim 14, wherein the node further is configured to add a noise term to the long term interference characteristics.

21. The node according to claim 20, wherein the node is configured to:
adjust the noise term based on the current load in the cell or in the local region of the network, and/or
communicate the current setting for the noise term to a SON-capable node, and/or
adjust the noise term based on a message from a SON-capable node.

22. A non-transitory computer-readable storage medium carrying a computer program for adapting a beam shape of a beam in a wireless communication system, said communication system having multiple nodes, wherein each node is provided with an antenna system configured to provide radio coverage in a cell by a cell specific beam, the computer program comprising:
instructions that when executed by at least one processor of a node thereby cause the node:
obtain information of users to be served by a given cell, and obtaining information of users that said given cell should avoid interfering with and that are served by other cells;
obtain information of a spatial channel characteristics for each of said users to be served by said given cell;
obtain aggregated information of spatial channel characteristics for users that said given cell should avoid interfering with, to estimate a long term interference characteristics;
calculate a transmit weight vector for each of said users to be served by said given cell based on the information of spatial channel characteristics for said user to be served by said given cell and the estimated long term interference characteristics;
perform phase normalization of the calculated transmit weight vector for each of said users to be served by said given cell;

aggregate all transmit weight vectors of the users to serve to establish a common transmit weight vector used to form the beam shape for the cell specific beam; and transmit the cell specific beam in a beam shape formed by the common transmit weight vector.

* * * * *